(12) United States Patent
Spohn et al.

(10) Patent No.: US 7,323,666 B2
(45) Date of Patent: Jan. 29, 2008

(54) INDUCTIVELY HEATABLE COMPONENTS

(75) Inventors: Peter Dwight Spohn, Brookline, NH (US); Richard George Hoeck, Merrimack, NH (US); Satish S. Sharma, Lowell, MA (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 0 days.

(21) Appl. No.: 10/730,173

(22) Filed: Dec. 8, 2003

(65) Prior Publication Data

US 2005/0121437 A1 Jun. 9, 2005

(51) Int. Cl.
*H05B 6/12* (2006.01)
*A47J 37/06* (2006.01)
*B65G 15/48* (2006.01)

(52) U.S. Cl. .............. 219/620; 219/634; 219/653; 99/DIG. 14; 426/234

(58) Field of Classification Search ........ 219/633–635, 219/620–621, 653–658; 99/DIG. 14; 426/234; 156/272.4
See application file for complete search history.

(56) References Cited

U.S. PATENT DOCUMENTS

| | | | | |
|---|---|---|---|---|
| 2,839,651 A | * | 6/1958 | Erickson | ............... 219/649 |
| 3,883,386 A | * | 5/1975 | Garbini et al. | .......... 219/675 |
| 4,041,207 A | | 8/1977 | Takada et al. | |
| 4,717,428 A | | 1/1988 | Comstock et al. | |
| 4,883,716 A | | 11/1989 | Effenberger et al. | |
| 5,075,065 A | | 12/1991 | Effenberger et al. | |
| 5,133,402 A | | 7/1992 | Ross | |
| 5,141,800 A | | 8/1992 | Effenberger et al. | |
| 5,157,233 A | | 10/1992 | Inokuma et al. | |
| 5,357,085 A | | 10/1994 | Sturman, Jr. | |
| 5,479,684 A | | 1/1996 | Murphy | |
| 5,483,043 A | | 1/1996 | Sturman, Jr. et al. | |
| 5,486,684 A | | 1/1996 | Peterson et al. | |
| 5,488,219 A | | 1/1996 | Tanaka et al. | |
| 5,495,094 A | | 2/1996 | Rowan et al. | |
| 5,508,496 A | | 4/1996 | Hansen et al. | |
| 5,510,600 A | | 4/1996 | Jackson | |
| 5,523,549 A | | 6/1996 | Tenzer et al. | |
| 5,523,550 A | | 6/1996 | Kimura | |

(Continued)

FOREIGN PATENT DOCUMENTS

EP 0 237 463 A 9/1987

(Continued)

*Primary Examiner*—Philip H. Leung
(74) *Attorney, Agent, or Firm*—Larson Newman Abel Polansky & White, LLP; Chi Suk Kim

(57) ABSTRACT

Aspects of the invention are found in a heating component having a composite material coated on a support. The composite material includes a fluorinated or silicone polymer and inductively-heatable particles. Additional aspects of the invention are found in a heating belt having a flexible support coated with a composite material. The composite material includes a polymer material and inductively-heatable particles. Further aspects of the invention are found in a system for heating an article. The system includes a heating belt and a field generator. The heating belt includes a flexible support coated in a composite material. The composite material includes a polymeric matrix and inductively-heatable particles. The field generator induces a field about the heating belt. The inductively-heatable particles heat in the presence of the field.

50 Claims, 3 Drawing Sheets

U.S. PATENT DOCUMENTS

| | | | |
|---|---|---|---|
| 5,525,780 A | 6/1996 | Moslehi | |
| 5,526,103 A | 6/1996 | Kato et al. | |
| 5,526,561 A | 6/1996 | McGaffigan | |
| 5,528,019 A | 6/1996 | Shintani et al. | |
| 5,530,227 A | 6/1996 | Matsen et al. | |
| 5,532,461 A | 7/1996 | Crummenauer et al. | |
| 5,534,313 A | 7/1996 | Kung et al. | |
| 5,548,101 A | 8/1996 | Lee | |
| 5,550,353 A | 8/1996 | Peysakhovich et al. | |
| 5,550,354 A | 8/1996 | Kimura et al. | |
| 5,553,729 A | 9/1996 | Kitano et al. | |
| 5,554,836 A | 9/1996 | Stanescu et al. | |
| 5,558,795 A | 9/1996 | Frank | |
| 5,571,436 A | 11/1996 | Gregg et al. | |
| 5,571,438 A | 11/1996 | Izaki et al. | |
| 5,582,790 A | 12/1996 | Ferry et al. | |
| 5,587,098 A | 12/1996 | Matsen et al. | |
| 5,591,369 A | 1/1997 | Matsen et al. | |
| 5,591,370 A | 1/1997 | Matsen et al. | |
| 5,601,743 A | 2/1997 | Mednikov et al. | |
| 5,603,858 A | 2/1997 | Wyatt et al. | |
| 5,628,241 A | 5/1997 | Chavanaz et al. | |
| 5,645,747 A | 7/1997 | Matsen et al. | |
| 5,660,753 A | 8/1997 | Lingnau | |
| 5,660,754 A | 8/1997 | Haldeman | |
| 5,672,290 A | 9/1997 | Levy et al. | |
| 5,683,608 A | 11/1997 | Matsen et al. | |
| 5,690,851 A | 11/1997 | Yoshioka et al. | |
| 5,691,685 A | 11/1997 | Delucia | |
| 5,698,125 A | 12/1997 | Kwon | |
| 5,710,411 A | 1/1998 | Tippins et al. | |
| 5,710,414 A | 1/1998 | Matsen et al. | |
| 5,714,739 A | 2/1998 | Irrera et al. | |
| 5,718,946 A | 2/1998 | Vignaud | |
| 5,739,506 A | 4/1998 | Hanton et al. | |
| 5,744,784 A | 4/1998 | Schluckebier | |
| 5,752,148 A * | 5/1998 | Yoneda et al. | 219/619 |
| 5,763,859 A | 6/1998 | Wirz et al. | |
| 5,767,490 A | 6/1998 | Peter | |
| 5,770,838 A | 6/1998 | Rohrbaugh et al. | |
| 5,773,799 A | 6/1998 | Maxfield et al. | |
| 5,781,581 A | 7/1998 | Fishman et al. | |
| 5,783,806 A | 7/1998 | Hayasaki | |
| 5,786,643 A | 7/1998 | Wyatt et al. | |
| 5,793,024 A | 8/1998 | Matsen et al. | |
| 5,808,280 A | 9/1998 | Gaspard | |
| 5,808,535 A | 9/1998 | Delucia | |
| 5,821,504 A | 10/1998 | Sprenger et al. | |
| 5,834,743 A | 11/1998 | Lund et al. | |
| 5,844,213 A | 12/1998 | Peysakhovich et al. | |
| 5,854,473 A | 12/1998 | Malnoe | |
| 5,872,352 A | 2/1999 | Suganuma et al. | |
| 5,874,713 A | 2/1999 | Cydzik et al. | |
| 5,881,349 A | 3/1999 | Nanataki et al. | |
| 5,886,325 A | 3/1999 | Lund | |
| 5,895,598 A | 4/1999 | Kitano et al. | |
| 5,895,599 A | 4/1999 | Nivoche | |
| 5,902,508 A | 5/1999 | Kimura et al. | |
| 5,914,065 A | 6/1999 | Alavi | |
| 5,922,234 A | 7/1999 | Grow et al. | |
| 5,922,453 A | 7/1999 | Horn, III et al. | |
| 5,923,699 A | 7/1999 | Swanger | |
| 5,928,550 A | 7/1999 | Weiss | |
| 5,928,551 A | 7/1999 | Okabayashi | |
| 5,935,476 A | 8/1999 | Langstedt | |
| 5,990,464 A | 11/1999 | Hino et al. | |
| 5,993,058 A | 11/1999 | Rochard et al. | |
| 5,994,682 A | 11/1999 | Kelly et al. | |
| 6,002,118 A | 12/1999 | Kawano et al. | |
| 6,008,480 A | 12/1999 | Lund | |
| 6,011,246 A | 1/2000 | Bonzano et al. | |
| 6,024,913 A | 2/2000 | Ogawa et al. | |
| 6,031,215 A | 2/2000 | Nanataki et al. | |
| 6,038,902 A | 3/2000 | Talley et al. | |
| 6,043,469 A | 3/2000 | Fink et al. | |
| 6,043,470 A | 3/2000 | Dahl | |
| 6,045,648 A * | 4/2000 | Palmgren et al. | 219/634 |
| 6,048,599 A * | 4/2000 | Chu et al. | 219/634 |
| 6,056,844 A | 5/2000 | Guiles et al. | |
| 6,059,953 A | 5/2000 | Hatta et al. | |
| 6,078,033 A | 6/2000 | Bowers et al. | |
| 6,078,781 A | 6/2000 | Takagi et al. | |
| 6,084,222 A | 7/2000 | Morimoto et al. | |
| 6,087,641 A | 7/2000 | Kinouchi et al. | |
| 6,091,063 A | 7/2000 | Woods | |
| 6,097,012 A | 8/2000 | Shiozuka | |
| 6,097,926 A | 8/2000 | Takagi et al. | |
| 6,121,591 A | 9/2000 | Eskildsen | |
| 6,121,592 A | 9/2000 | Fishman et al. | |
| 6,124,581 A | 9/2000 | Ulrich | |
| 6,147,336 A | 11/2000 | Ushijima et al. | |
| 6,148,019 A | 11/2000 | Fishman et al. | |
| 6,153,863 A | 11/2000 | Snowball | |
| 6,166,359 A | 12/2000 | Cruickshank | |
| 6,180,933 B1 | 1/2001 | Demidovitch et al. | |
| 6,184,508 B1 | 2/2001 | Isoyama et al. | |
| 6,188,054 B1 | 2/2001 | Ohta | |
| 6,195,525 B1 | 2/2001 | Maeyama | |
| 6,211,498 B1 | 4/2001 | Patridge et al. | |
| 6,214,401 B1 | 4/2001 | Chaput et al. | |
| 6,218,649 B1 | 4/2001 | Isoyama et al. | |
| 6,222,167 B1 | 4/2001 | Wada et al. | |
| 6,229,126 B1 | 5/2001 | Ulrich et al. | |
| 6,232,586 B1 | 5/2001 | Eskildsen | |
| 6,238,421 B1 | 5/2001 | Gunther et al. | |
| 6,246,035 B1 | 6/2001 | Okuda | |
| 6,246,036 B1 | 6/2001 | Tsujimoto et al. | |
| 6,246,241 B1 | 6/2001 | Newland | |
| 6,252,212 B1 | 6/2001 | Takagi et al. | |
| 6,255,632 B1 | 7/2001 | Yokoyama et al. | |
| 6,255,633 B1 | 7/2001 | Takagi et al. | |
| 6,262,402 B1 | 7/2001 | Isoyama et al. | |
| 6,262,404 B1 | 7/2001 | Higaya et al. | |
| 6,278,094 B1 | 8/2001 | Rindfleisch et al. | |
| 6,278,095 B1 | 8/2001 | Bass et al. | |
| 6,278,096 B1 | 8/2001 | Bass | |
| 6,279,646 B1 | 8/2001 | Ross et al. | |
| 6,285,014 B1 | 9/2001 | Beck et al. | |
| 6,288,375 B1 | 9/2001 | Lappi et al. | |
| 6,288,376 B1 | 9/2001 | Tsumura | |
| 6,288,378 B1 | 9/2001 | Patridge et al. | |
| 6,289,033 B1 | 9/2001 | Tipton et al. | |
| 6,291,805 B1 | 9/2001 | Simeray et al. | |
| 6,292,648 B1 | 9/2001 | Higaya et al. | |
| 6,297,483 B2 | 10/2001 | Sadahira et al. | |
| 6,300,608 B2 | 10/2001 | Inoh et al. | |
| 6,303,912 B1 | 10/2001 | Eskildsen | |
| 6,307,875 B1 | 10/2001 | Tsuda et al. | |
| 6,310,333 B2 | 10/2001 | Shibata et al. | |
| 6,316,753 B2 | 11/2001 | Clothier et al. | |
| 6,316,755 B1 | 11/2001 | Ulrich | |
| 6,320,168 B1 | 11/2001 | Kimata et al. | |
| 6,320,169 B1 | 11/2001 | Clothier | |
| 6,321,046 B1 | 11/2001 | Kikuchi et al. | |
| 6,323,469 B1 | 11/2001 | Bissdorf et al. | |
| 6,327,456 B1 | 12/2001 | Higaya | |
| 6,335,517 B1 | 1/2002 | Chauviaux et al. | |
| 6,336,027 B1 | 1/2002 | Sakai et al. | |
| 6,340,810 B2 | 1/2002 | Yokoyama et al. | |
| 6,346,690 B1 | 2/2002 | Ulrich et al. | |
| 6,359,267 B1 | 3/2002 | Wilcox et al. | |
| 6,365,884 B1 | 4/2002 | Hanton | |
| 6,366,757 B1 | 4/2002 | Tsujimoto et al. | |
| 6,369,370 B1 | 4/2002 | Eskildsen | |

| | | |
|---|---|---|
| 6,373,035 B1 | 4/2002 | Okamoto et al. |
| 6,373,036 B2 | 4/2002 | Suzuki |
| 6,377,778 B1 | 4/2002 | Kikuchi et al. |
| 6,385,231 B2 | 5/2002 | Tsuda et al. |
| 6,397,107 B1 | 5/2002 | Lee et al. |
| 6,400,749 B1 | 6/2002 | Weiss |
| 6,405,014 B2 | 6/2002 | Takano et al. |
| 6,407,552 B1 | 6/2002 | Newland |
| 6,410,895 B2 | 6/2002 | Shibata et al. |
| 6,427,056 B1 | 7/2002 | Kawano et al. |
| 2001/0000402 A1 | 4/2001 | Shibata et al. |
| 2001/0001465 A1 | 5/2001 | Inoh et al. |
| 2001/0005523 A1 | 6/2001 | Chaput et al. |
| 2001/0007323 A1 | 7/2001 | Clothier et al. |
| 2001/0015352 A1 | 8/2001 | Ohishi et al. |
| 2001/0022299 A1 | 9/2001 | Takagi et al. |
| 2001/0022801 A1 | 9/2001 | Tsuda et al. |
| 2001/0025840 A1 | 10/2001 | Yokoyama et al. |
| 2001/0025848 A1 | 10/2001 | Cornec et al. |
| 2001/0034170 A1 | 10/2001 | Keese |
| 2001/0038006 A1 | 11/2001 | Shibata et al. |
| 2001/0052520 A1 | 12/2001 | Lappi et al. |
| 2002/0003139 A1 | 1/2002 | Ohishi et al. |
| 2002/0003969 A1 | 1/2002 | Kimoto et al. |
| 2002/0003980 A1 | 1/2002 | Takano et al. |
| 2002/0005405 A1 | 1/2002 | Sato et al. |
| 2002/0008632 A1 | 1/2002 | Clothier |
| 2002/0011485 A1 | 1/2002 | Suzuki |
| 2002/0011486 A1 | 1/2002 | Anderhuber et al. |
| 2002/0011913 A1 | 1/2002 | Patridge et al. |
| 2002/0017519 A1 | 2/2002 | Takagi et al. |
| 2002/0020698 A1 | 2/2002 | Okamoto et al. |
| 2002/0023920 A1 | 2/2002 | Abe et al. |
| 2002/0027940 A1 | 3/2002 | Tsuda et al. |
| 2002/0031381 A1 | 3/2002 | Miyahara et al. |
| 2002/0036200 A1 | 3/2002 | Ulrich |
| 2002/0039504 A1 | 4/2002 | Nakayama et al. |
| 2002/0043531 A1 | 4/2002 | Uehara et al. |
| 2002/0044788 A1 | 4/2002 | Kawano et al. |
| 2002/0056711 A1 | 5/2002 | Nitsche et al. |
| 2002/0060218 A1 | 5/2002 | Ulrich |
| 2002/0067926 A1 | 6/2002 | Kimoto et al. |
| 2002/0079121 A1 | 6/2002 | Ryan et al. |
| 2002/0080847 A1 | 6/2002 | Tsuda et al. |
| 2002/0085613 A1 | 7/2002 | Tsuda et al. |
| 2002/0085614 A1 | 7/2002 | Tsuda et al. |
| 2002/0092845 A1 | 7/2002 | Panczner |
| 2002/0092846 A1 | 7/2002 | Yamamoto et al. |
| 2002/0103614 A1 | 8/2002 | Naito et al. |
| 2002/0113066 A1 | 8/2002 | Stark et al. |

FOREIGN PATENT DOCUMENTS

| | | | |
|---|---|---|---|
| EP | 0 403 276 A | | 12/1990 |
| JP | 09-215605 | * | 8/1997 |
| WO | WO 01/85827 A | | 11/2001 |

* cited by examiner

US 7,323,666 B2

INDUCTIVELY HEATABLE COMPONENTS

TECHNICAL FIELD OF THE INVENTION

This application in general relates to temperature-controllable induction heating components, systems incorporating inductively-heatable components, and methods for heating articles.

BACKGROUND

Belt systems are used in various industrial heating processes for heat treating articles. These industrial heating applications typically incorporate convective or radiant heaters on one side of the belt apparatus, which heat the belt and in turn heat articles placed on the belt. Such processes have various disadvantages. Generally, such belts are non-conducting or insulating. This insulating effect requires the conductive heaters to be run at undesirably high temperatures in order to achieve the target temperature for treating the article, resulting in a waste of energy and higher processing costs. In addition, these excess temperatures result in belt degradation and, as a result, shorter equipment life cycles.

As such, many typical heating processes suffer from deficiencies such as excess energy usage and belt degradation. Therefore improved heatable components, heating belts, and industrial heating systems are desirable.

SUMMARY

Aspects of the invention are found in a heating belt having a flexible support coated with a composite material. The composite material includes a polymer material and inductively-heatable particles.

Additional aspects of the invention are found in a heating component having a composite material. The composite material includes a fluorinated polymer and inductively-heatable particles.

Other aspects of the invention are found in a heating component having a composite material. The composite material includes a silicone polymer and inductively-heatable particles.

Further aspects of the invention are found in a system for heating an article. The system includes a heating belt and a field generator. The heating belt includes a flexible support coated in a composite material, the composite material including a polymeric matrix and inductively-heatable particles. The field generator induces a field about the heating belt, such that the inductively-heatable particles heat in the presence of the field.

Aspects of the invention are also found in a method for heating an article. The method includes placing the article in proximity to a heating belt and inducing a field about the heating belt. The heating belt includes a flexible support coated in a composite material. The composite material includes a polymeric matrix and inductively-heatable particles. The inductively-heatable particles heat in the presence of the field, thereby heating the article.

DETAILED DESCRIPTION

According to an embodiment of the invention a heating component includes a composite material. The composite material generally includes a polymer matrix and inductively-heatable particles. The polymer matrix may be formed of various polymers including fluorinated polymers such as PTFE and FEP. These inductively-heatable particles may be susceptors, ferromagnetic particles, and other particles that heat in the presence of an electromagnetic field. The composite material may be coated on a support.

Figure 1:
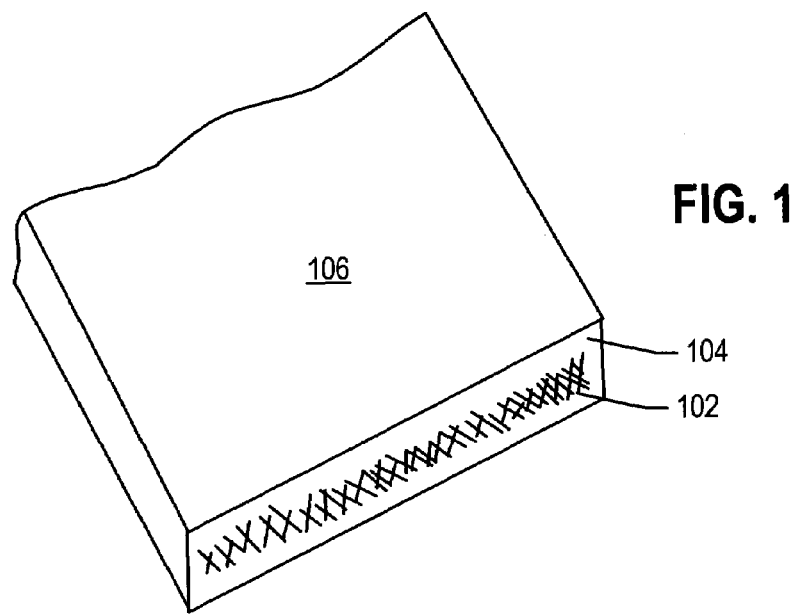
FIG. 1 depicts an exemplary embodiment of a heating belt.

FIG. 1 illustrates an exemplary embodiment of a heating component. The heating component 100 includes a support 102 coated with a composite material 104. In the presence of an electromagnetic field, particles within the composite material 104 heat, resulting in heat transfer through surface 106. As such, surface 106 may be used in various heating processes such as cooking and side-sealing, such as in industrial or commercial settings.

The support 102 may take the form of reinforcement, such as woven materials including fabrics and meshes. For example, the fabric may be a woven fabric or an intermeshing of random fibrous strands. In one exemplary embodiment, the fabric is a woven glass fabric. In other embodiments, the support may include a mesh of ceramic, plastic, or metallic material or sheets of composite materials, among others. The fabric may have flexibility, for those applications that require the heating component to bend or conform to different contours. Alternately, the support 102 may take the form of a substrate, typically a sheet that has sufficient rigidity to provide structural support for mechanical integrity and shape. In some forms, the substrate may be generally planar, which may be particularly useful in cooking applications, to provide a cooking surface. Embodiments may use supports formed of high melting point thermoplastics, such as thermoplastic polyimides, polyether-ether ketones, polyaryl ketones, polyphenylene sulfide, and polyetherimides; thermosetting plastics, particularly of the high temperature capable thermosetting resins, such as polyimides; coated or laminated textiles based on the above thermoplastics or similar thermally stable resins and thermally stable reinforcements such as fiberglass, graphite, polyaramid, and aromatic polyamide; plastic coated metal foil; and metallized or metal foil laminated plastic films. In addition, exemplary embodiments include woven Kevlar®, aramids, and polyesters. Further exemplary supports may be found in U.S. Pat. No. 4,883,716, U.S. Pat. No. 5,075,065, and U.S. Pat. No. 5,141,800, each of which are included in their entirety by reference.

The support may be coated with a composite material through various techniques such as dip-coating and laminating. In the case of dip-coating, the support material is dipped into a solution containing the components of a composite material. Then, the support coated in the solution is dried, cured, baked, or processed to produce the composite coating. In one exemplary apparatus, a pre-treated carrier belt is dipped through a dispersion of the composite material in a dip pan at the base of a casting tower such that a coating of dispersion forms on the carrier belt. The coated carrier belt then passes through a metering zone in which metering bars remove excess dispersion from the coated carrier belt. After the metering zone, the coated carrier belt passes into a drying zone, which is maintained at a temperature sufficient to remove the carrier liquid from the dispersion, giving rise to a dried film. The carrier belt with the dried film then passes to a bake/fuse zone in which the temperature is sufficient to consolidate or fuse the polymer in the dispersion. Finally, the carrier belt passes through a cooling plenum from which it can be directed either to a subsequent dip pan to begin formation of a further layer of film or to a stripping apparatus. Exemplary dip-coating methods may be found in U.S. Pat. No. 4,883,716 and U.S. Pat. No. 5,075,065, each of which are included in their entirety by reference. In another embodiment, sheets of composite material are formed and subsequently layered over the support. These sheets may be further processed to bond to the support material.

The composite material generally includes a polymer material and inductively-heatable particles, the composite material forming a matrix material. The polymer may have a carbon chain structure or a silicon chain structure. Carbon chain polymer materials may be any one of or a combination of various polymer materials such as poly(etheretherketone) (PEEK), polyetherketoneketone (PEKK), poly(etherimide) (PEI), polyphenylene sulfide (PPS), poly(sulfone) (PSU), polyethylene terephthalate (PET), polyester, polyamide (PA), polypropylene (PP), polyurethane (PU), polyphenylene oxide (PPO), polycarbonate (PC), PP/MXD6™ (polymer of 1,3-benzenedimethanamine (metaxylenediamine, MXDA) and adipic acid (hereinafter referred to as "mxd")), PP/ethylene vinyl alcohol (EVOH), polyethylene (PE), polyimide, polyamide-imide (PAI), and combinations thereof. In addition, carbon based polymers include fluorinated polymers such as fluorinated ethylene propylene (FEP), polytetrafluoroethylene (PTFE), tetrafluoroethylene (TFE), hexafluoropropylene (HFP), perfluoropropyl or perfluoromethyl vinyl ether, homo and copolymers having chlorotrifluoroethylene (CTFE), homo and copolymers having vinylidene fluoride (VF2), homo and copolymers having vinyl fluoride (VF), perfluoralkoxy (PFA), and combinations thereof. In one exemplary embodiment, a PTFE polymer may include polymeric modifiers, including fluoropolymers, both thermoplastic and elastomeric, such as copolymers having tetrafluoroethylene (TFE), hexafluoropropylene (HFP), perfluoropropyl or perfluoromethyl vinyl ether, homo and copolymers having chlorotrifluoroethylene (CTFE), homo and copolymers having vinylidene fluoride (VF2), homo and copolymers having vinyl fluoride (VF), and blends thereof. Exemplary polymer blends are described in U.S. Pat. 5,141,800, which is included herein in its entirety. In another exemplary embodiment, a carbon based polymer material may be a polyimide.

In a further exemplary embodiment, the polymer may be embodied as silicon based polymer material such as a silicone polymer. For example, the polymer may be formed from a liquid silicone rubber (LSR). An exemplary LSR formulation may comprise vinyl terminated polydimethylsiloxane polymer. The LSR formulation may further include catalysts, fillers, crosslinking agents, inhibitors, pigments, and other additives. The silicone may include a platinum catalyst or an organic peroxide catalyst. Exemplary embodiments of silicone polymers include Wacker Silicones Elastosil® products. Exemplary silicone polymers may be found in the published U.S. patent application Ser. No. 09/765,695, which is included herein in its entirety.

The polymer material typically forms a polymer matrix surrounding inductively-heatable particles. These particles may be included in the polymer matrix in amounts between about 10 vol. % and 50 vol. %. For example, the particles may be included in the polymer matrix in amounts between about 25 vol % and 40 vol %.

The inductively-heatable particles are particles that heat in the presence of an electromagnetic field. For example, a field generator containing an induction coil may be used to generate an alternating or oscillating electromagnetic field that causes the inductively-heatable particles to heat. In some exemplary cases the inductively-heatable particles or susceptors heat to a Curie temperature. The particles may be made of various materials in various shapes. Each of these materials in each of various shapes may heat to differing temperatures in the presence of oscillating electromagnetic fields having various characteristics. For example, two or more differing particle species contained in the same heating component may heat to respectively differing temperatures for a given electromagnetic field frequency and power. The particles may be formed of various materials such as ferromagnetic materials. In one exemplary embodiment, the materials may be hexagonal ferrite materials. In other embodiments, the materials may include strontium fluoride, zircalloy (zirconium alloy), and compounds stoichiometrically having two divalent cations combined with one of Ba1Fe16O26, Ba2Fe12O22, and Ba3Fe24O41. Examples of these compounds are shown in Table 1, below. The divalent cations may be magnesium, cobalt, manganese, zinc, or combinations of these, among others. In exemplary embodiments, the inductively-heatable particles may be Triton® Cf-32 or FP350 by Powdertech Corp.

TABLE 1

| | | |
|---|---|---|
| $Co_2Ba_1Fe_{16}O_{26}$ | $Co_2Ba_2Fe_{12}O_{22}$ | $Co_2Ba_3Fe_{24}O_{41}$ |
| $Co_1Zn_1Ba_1Fe_{16}O_{26}$ | $Co_1Zn_1Ba_2Fe_{12}O_{22}$ | $Co_1Zn_1Ba_3Fe_{24}O_{41}$ |
| $Mg_2Ba_1Fe_{16}O_{26}$ | $Mg_2Ba_2Fe_{12}O_{22}$ | $Mg_2Ba_3Fe_{24}O_{41}$ |
| $Mg_1Zn_1Ba_1Fe_{16}O_{26}$ | $Mg_1Zn_1Ba_2Fe_{12}O_{22}$ | $Mg_1Zn_1Ba_3Fe_{24}O_{41}$ |
| $Mn_2Ba_1Fe_{16}O_{26}$ | $Mn_2Ba_2Fe_{12}O_{22}$ | $Mn_2Ba_3Fe_{24}O_{41}$ |
| $Mn_1Zn_1Ba_1Fe_{16}O_{26}$ | $Mn_1Zn_1Ba_2Fe_{12}O_{22}$ | $Mn_1Zn_1Ba_3Fe_{24}O_{41}$ |

Referring back to FIG. 1, the surface 106 may be used to heat various articles. For example, the heating component 100 may be used as a cooking belt. Food articles such as meat patties, whole or partial chicken breasts, chicken nuggets, baked goods, bacon, baked snacks, and others, may be cooked on the surface 106. In another example, a package may be sealed through heat from the surface 106, as in the form of a side sealing belt. Such packages may be wrapped in a thermoplastic that shrinks and/or melts to fit the package when subjected to heat. In a further example, the surface 106 may be used as an inductively-heated nonstick cooking surface, an industrial grill, or an industrial side sealing apparatus, among others.

Figure 2A:
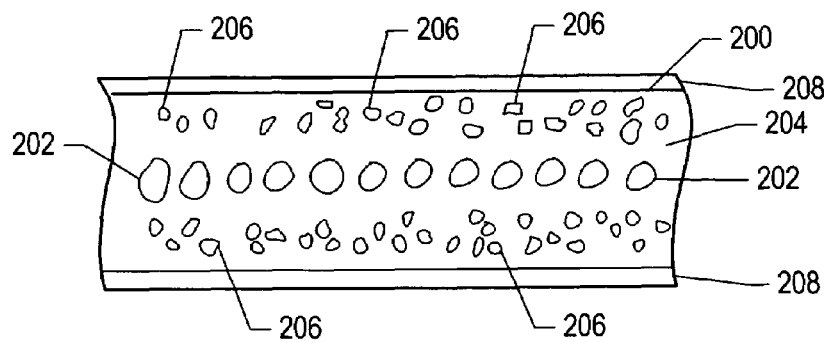
FIGS. 2A, 2B, 2C and 3 illustrate cross-sections of exemplary embodiments of heating structures.

FIG. 2A illustrates a cross-section of an exemplary heating component. The heating component 200 includes support 202 coated in a polymer matrix 204. Included in the polymer matrix are susceptors or inductively-heatable particles 206. The heating component may also include additional layers 208, described in more detail below.

The support 202 may take various forms including fabrics, meshes or sheets of material, as noted above. The support may be a reinforcement such as a woven sheet or a substrate such as a planar sheet. In one exemplary embodiment, the support 202 is a woven fabric formed of glass fibers, Kevlar®, aramids, or polyesters. Alternately, a mesh of plastic, metal, ceramics, or other materials may be used.

The polymer matrix 204 may be formed with various polymers having a carbon chain structure or a silicon chain structure. Carbon chain polymer materials may be any one of or a combination of various polymer materials such as poly(etheretherketone) (PEEK), polyetherketoneketone (PEKK), poly(etherimide) (PEI), polyphenylene sulfide (PPS), poly(sulfone) (PSU), polyethylene terephthalate (PET), polyester, polyamide (PA), polypropylene (PP), polyurethane (PU), polyphenylene oxide (PPO), polycarbonate (PC), PP/MXD6™, PP/ethylene vinyl alcohol (EVOH), polyethylene (PE), polyimide, polyamide-imide (PAI), and combinations thereof. In addition, carbon based polymers include fluorinated polymers such as fluorinated ethylene propylene (FEP), polytetrafluoroethylene (PTFE), tetrafluoroethylene (TFE), hexafluoropropylene (HFP), perfluoropropyl or perfluoromethyl vinyl ether, homo and copolymers having chlorotrifluoroethylene (CTFE), homo and copolymers having vinylidene fluoride ($VF_2$), homo and copolymers having vinyl fluoride (VF), perfluoralkoxy (PFA), and combinations thereof. In one exemplary embodiment, a PTFE polymer may include polymeric modifiers, including fluoropolymers, both thermoplastic and elastomeric, such as copolymers having tetrafluoroethylene (TFE), hexafluoropropylene (HFP), perfluoropropyl or perfluoromethyl vinyl ether, homo and copolymers having chlorotrifluoroethylene (CTFE), homo and copolymers having vinylidene fluoride ($VF_2$), homo and copolymers having vinyl fluoride (VF), and blends thereof. Exemplary polymer blends are described in U.S. Pat. No. 5,141,800, which is included herein in its entirety. In another exemplary embodiment, a carbon based polymer material may be a polyimide. The polymer may alternately comprise a silicone polymer such as a vinyl terminated polydimethylsiloxane.

The susceptors or inductively-heatable particles 206 may take various forms such as ferromagnetic materials, hexagonal ferrites, zircalloy, and others. In some embodiments, the materials may include strontium fluoride, zircalloy, and compounds stoichiometrically having two divalent cations combined with one of $Ba_1Fe_{16}O_{26}$, $Ba_2Fe_{12}O_{22}$, and $Ba_3Fe_{24}O_{41}$. The divalent cations may be magnesium, cobalt, manganese, zinc, or combinations of these, among others. These particles may be incorporated in to the polymer matrix in amounts within a range of about 10 vol. % and 50 vol. %, such as about 20 vol. % to 50 vol. % or a narrower range of about 25 vol. % to 40 vol. %. In addition, various combinations of particles having different compositions and/or different particle shapes and sizes may be included in the polymer matrix 204.

The additional layer 208 may take various forms such as a polymer coating, or an insulating coating, among others. For example, in a cooking application, the additional layer 208 may be used to isolate food from the inductively-heated particles. The additional layer 208 may be formed of polymers having a carbon chain structure or a silicon chain structure. Carbon chain polymer materials may be any one of or a combination of various polymer materials such as poly(etheretherketone) (PEEK), polyetherketoneketone (PEKK), poly(etherimide) (PEI), polyphenylene sulfide (PPS), poly(sulfone) (PSU), polyethylene terephthalate (PET), polyester, polyamide (PA), polypropylene (PP), polyurethane (PU), polyphenylene oxide (PPO), polycarbonate (PC), PP/MXD6™, PP/ethylene vinyl alcohol (EVOH), polyethylene (PE), polyimide, polyamide-imide (PAI), and combinations thereof. In addition, carbon based polymers include fluorinated polymers such as fluorinated ethylene propylene (FEP), polytetrafluoroethylene (PTFE), tetrafluoroethylene (TFE), hexafluoropropylene (HFP), perfluoropropyl or perfluoromethyl vinyl ether, homo and copolymers having chlorotrifluoroethylene (CTFE), homo and copolymers having vinylidene fluoride ($VF_2$), homo and copolymers having vinyl fluoride (VF), perfluoralkoxy (PFA), and combinations thereof. In one exemplary embodiment, a PTFE polymer may include polymeric modifiers, including fluoropolymers, both thermoplastic and elastomeric, such as copolymers having tetrafluoroethylene (TFE), hexafluoropropylene (HFP), perfluoropropyl or perfluoromethyl vinyl ether, homo and copolymers having chlorotrifluoroethylene (CTFE), homo and copolymers having vinylidene fluoride ($VF_2$), homo and copolymers having vinyl fluoride (VF), and blends thereof. Exemplary polymer blends are described in U.S. Pat. No. 5,141,800, which is included herein in its entirety. In another exemplary embodiment, a carbon based polymer material may be a polyimide. The polymer may alternately comprise a silicone polymer such as a vinyl terminated polydimethylsiloxane.

The additional layer 208 may be formed on either or both sides of the heating component. The layer formed on an active surface may differ in composition from a layer formed on an inactive surface. The additional layer may also be textured, shaped, grooved, form cleats, or effectively form various surface structures. The polymer matrix 204 may also be shaped.

The inductively-heatable particles 206 may heat in the presence of an alternating electromagnetic field to a Curie temperature. Depending upon various factors such as particle type, size, shape and characteristics of the induced electromagnetic field, the inductively-heatable particles may heat to between 60° C. and 750° C. and preferably between 60° C. and 325° C.

Figure 2B:
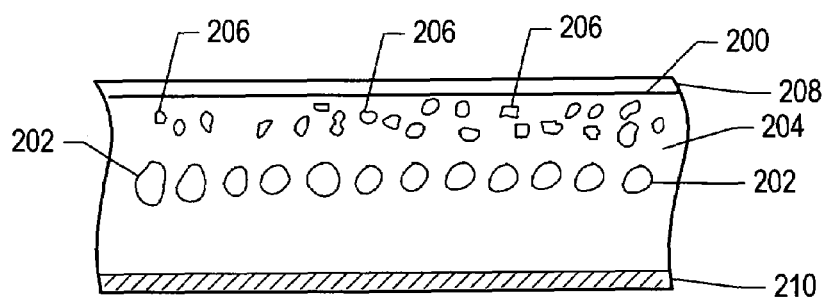

FIG. 2B depicts an alternate embodiment in which the inductively-heatable particles 206 are incorporated in the polymer matrix 204 to one side of the support or reinforcement 202 and not the other. This embodiment also depicts an additional layer 210 formed on an opposite major surface to that of layer 208. The additional layer 210 may be formed of an insulating material functioning to reduce heat flow through one surface. Heat primarily flows through or from an opposite major surface, the active heating surface. In this way, the thermal efficiency of the component may be enhanced. The additional layer 210 may be formed of insulating materials such as fiberglass fabrics, among others.

Figure 2C:
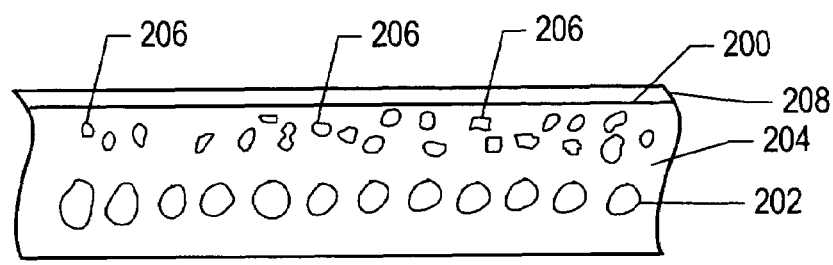

FIG. 2C depicts a further exemplary embodiment in which the inductively heatable particles are located to one side of reinforcement 202. The reinforcement 202 may, in some embodiments, act as an insulator functioning to reduce heat flow through the surface on the opposite layer 208.

In one exemplary embodiment, polymer matrix 204 may comprise PTFE and layer 208 may comprise silicone. In another exemplary embodiment, polymer matrix 204 may comprises silicone and layer 208 may comprise PTFE.

Figure 3:
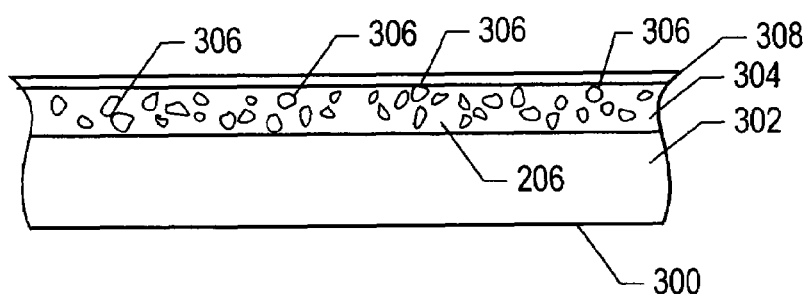

FIG. 3 illustrates an alternate embodiment of a heating component 300. The heating component 300 includes a support layer 302 and a polymer matrix layer 304. Inductively-heatable particles 306 reside in the polymer matrix layer 304. An additional layer 308 may also be included in the heating component 300.

The support layer 302 may be a substrate sheet of material, such as those support materials described above. Polymer matrix material may be layered or coated over the sheet 302. In one exemplary embodiment, the polymer matrix material comprises a fluorinated polymers such as fluorinated ethylene propylene (FEP), polytetrafluoroethylene (PTFE), or perfluoroalkoxy (PFA), and combinations thereof. The polymer matrix material may be a blend comprising fluorinated polymer. In a further exemplary embodiment, the polymer matrix material may include a silicone polymer. The additional layer 308 may be further coated over the polymer matrix layer 304, in accordance with the additional layers described above. In an alternate embodiment, another layer (not shown) may be coated on the opposite side of the support 302 from the polymer matrix layer 304 and may, for example, comprise insulating material. The heating component in this embodiment may take on the form of a generally planar sheet, for example. Such sheets can be used for commercial cooking applications, and be suitably rigid for such applications.

While as described above in accordance with FIGS. 1-3, a reinforcement layer or support layer is provided, in certain applications, such layers may not be utilized. For example, in contrast to FIG. 3, support layer 302 may be eliminated, such that the polymer matrix is substantially self-supporting and free standing. In addition to the embodiments described in relation to FIGS. 1-3, the material may be formed in to various objects, such as tubes, cylinders, and containers of various shapes. In an alternate embodiment, these objects of various shapes may be formed with a reinforcement layer or reinforcement material.

Figure 4:
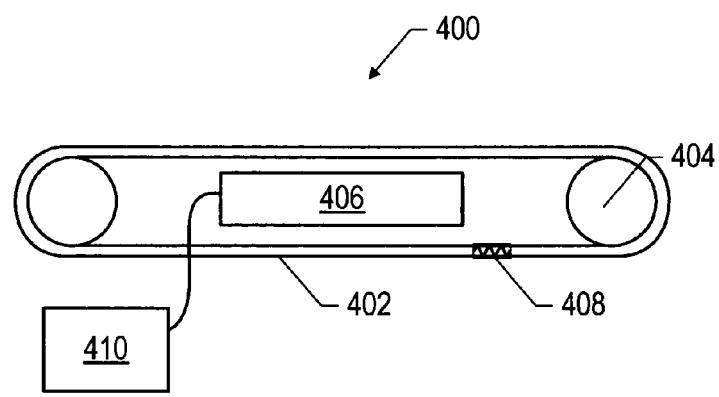
FIG. 4 depicts an exemplary heating system.

The heating components may be used in a heating belt structure as illustrated in FIG. 4. The system 400 includes a belt 402 and an inductive field generator 406. The belt 402 includes a flexible support, coated in a composite material. The composite material generally includes a polymer matrix and inductively-heatable particles. In the presence of an alternating electromagnetic field, the inductively-heatable particles heat to a Curie temperature. The Curie temperature may be influenced by the characteristics of the inductively-heatable particles and those characteristics of the inductive electromagnetic field. The control unit 410 may be used to influence the field generated by the field generator 406.

As shown in the particular embodiment, the belt 402 forms a closed loop belt. The closed loop belt is wrapped around drums 404. Typically, the heating belt is flexible to allow routing around the drums and continual rotational movement around the drums. The coated flexible support may constitute a portion of the belt or substantially the entirety of the belt. The belt may include other portions such as a lacing or clasp mechanism 408. The clasp or lacing 408 may or may not be influenced by the inductive electromagnetic field.

The field generator 406 may take various forms, and may include a coil. The field generator 406 may be configured to produce a field in a specific direction. Alternately, a portion of the belt loop may be shielded from the electromagnetic field. The controller 410 coupled to the inductive field generator 406 may vary characteristics of the induced electromagnetic field such that a desired temperature is achieved in the inductively-heatable particles of the belt 402, and accordingly, the target temperature of the belt itself and/or the active surface of the belt.

Alternately, a field generator may be used in conjunction with a sheet of composite material comprising a polymer matrix and the inductively-heatable particles. The sheet of composite material may or may not include a support.

Figure 5:
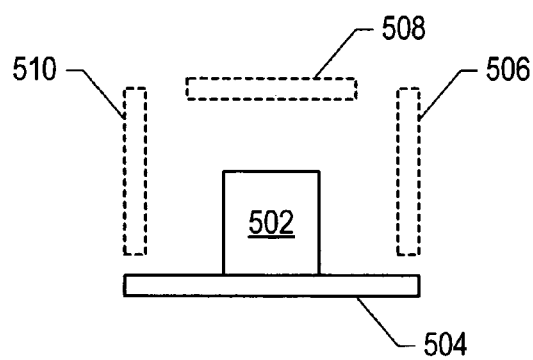
FIG. 5 illustrates an exemplary heating of an article.

Articles may be placed on, in, in contact with, or in proximity to the heating component. FIG. 5 depicts exemplary arrangements for heating an article 502. For example, the article 502 may be placed on the heating element 504. In alternate embodiments, heating components 506, 508 and 510 may be placed separately or in combinations about the article 502. For example, an article 502 may be placed on a belt 504 and an additional heating belt 508 may be placed above the article 502. In a further embodiment, belts 506 and 510 may be placed to the side of article 502.

Figure 6:
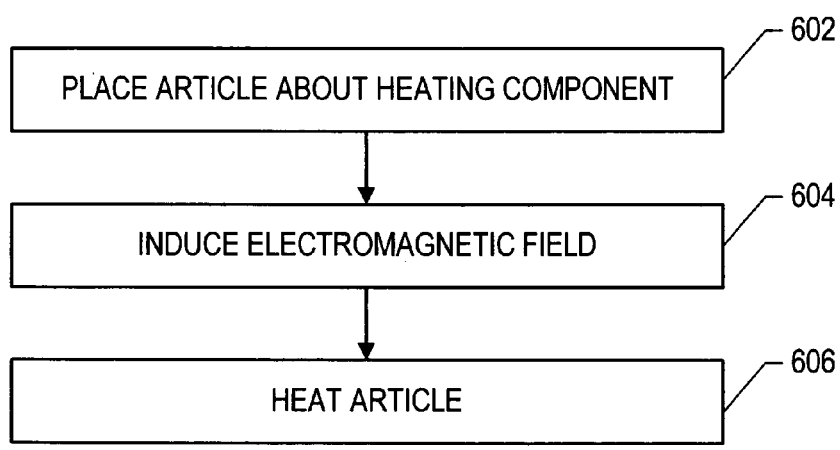
FIG. 6 is a block flow diagram depicting an exemplary method for heating an article.

FIG. 6 illustrates an exemplary method for heating an article. At step 602, the article is placed about a heating component. The heating component may for example be a heating belt. The heating belt may be formed with a flexible support structure and a polymer matrix surrounding inductively-heatable particles. For example, an article may be placed on a heating belt. The article may be a food item or a package. At step 604, an electromagnetic field may be induced about the heating belt. The inductively-heatable particles may heat in the presence of the electromagnetic field, as shown at step 606, and thereby heat the article.

EXAMPLES

Example 1

An aqueous slurry of S-35 Smart Bond Additive from Triton Systems, Inc. was made by blending 500 grams of S-35 with 25 grams of Rohm & Haas Tamol® 731, 13 grams of Triton® Cf-32 and 462 grams of deionized water. 480 grams of this slurry was then blended with 780 grams of Dyneon THV 340C to produce a formulation with a pigment to resin ratio of 38:62.

This formulation was used to coat a woven fiberglass fabric, Style 1080 from BGF Industries. The initial weight of the fabric is 1.4 oz/yd2. The fabric was dipped into the formulation and the excess coating was removed by wiping between two smooth 0.5" metering bars. This fabric was then dried for 2 minutes at 125° C. and then baked for 30 seconds at 200° C. This process was repeated for a total of 3 times to produce a coated fabric weighing 6 oz/yd2.

The laminated fabric was then placed in a 4 MHz induction field in order to heat the coated fabric. This demonstrated the ability of the induction field to heat the fabric.

Example 2

The base woven fiberglass Style 7628 from BGF Industries was coated with DuPont Teflon® T-30B to an approximate weight of 12 oz/yd2. A 1-oz/yd2 tie-layer of 50:50 T-30B and THV340C was then dip coated on top of the PTFE coating using the same metering technique described in Example 1. This coating was dried for 2 minutes at 125° C. and then baked for 1 minute at 380° C. Then the S-35/THV formulation from Example 1 was coated on one face of this fabric. Placing it on a flat horizontal surface and applying the coating with a #20 wire-wound 0.5" Meyer rod coated the fabric. The coating was then dried for 2 minutes at 125° C. and then baked for 1 minute at 200° C. Two layers of coating were applied using this process to create a coating of approximately 3 oz/yd2. The laminated fabric was then placed in a 4 MHz induction field in order to heat the coated fabric. This demonstrated the ability of the induction field to heat the fabric.

Example 3

A compound was made using a laboratory twin-rotor mixer with roller type rotors (Prep Mixer, C. W. Brabender Instrument Corp.). The Brabender was operated at 600 degrees F and 200 RPM. The compound consists of Daikin FEP NP20 and 37% by weight of FP350 by Powdertech Corp., Valpariso, Ind.

The compound was then compression molded into 4"×4"× 0.007" thick films using a Carver press operated at 600 degrees F. and 1000 PSI. The film was cut into 1" squares. The film was placed in a 4 MHz induction field. The film became very hot while in the field indicating that the induction field was heating the film.

Example 4

A roll of 96.5 cm (38 inch) wide, 203 g/m2 (6 ounce per square yard) ("osy") fiberglass fabric, industry style no. 7628, with most of the sizing removed by caramelization (210 finish) is coated by being drawn, at a rate of about 0.02 to 0.03 m/s (4 to 6 feet per minute), through a bath of an LSR formulation composed of 50 parts by weight each of Wacker Silicones Elastosil<LR6289A and LR6289B and about 12 parts by weight of a red iron oxide masterbatch containing about 35 percent iron oxide and about 65 percent vinyl terminated silicone polymer.

The LSR formulation is composed of 50 pbw of Dow Corning Corporation 9252-500P Part A and 50 pbw of 9252-500P Part B. Part A contains a platinum catalyst and Part B contains a crosslinker and a cure inhibitor that is removed by heating. The formulation also contains 75 pbw of a metal oxide mixture prepared to function as an inductive heating susceptor. The metal oxide mixture was purchased from Powdertech Corp., Valpariso, Ind., identified as product number FP350. The formulation viscosity is 50000 centipoise (Brookfield RV viscometer, No. 6 spindle at 10 rpm).

All components of the LSR formulation were certified by their manufacturers to comply with the requirements of 21 C.F.R. § 177.2600 for rubber articles intended for food contact applications. After the saturated and coated web emerges from the bath, the excess formulation is removed by drawing the web between two cylindrical wiper bars spaced about 0.38 mm (0.015 inch) apart. One bar is smooth; the other bar has incorporated regularly spaced circumferential turned grooves 3.17 mm (0.125 inch) wide and 3.17 mm (0.125 inch) deep on 25.4 mm (1 inch) centers. As the web is drawn between these bars and excess material is removed, a smooth surface is produced on one face by the smooth bar, and a smooth surface broken by parallel, longitudinal ribs or ribs is produced on the opposite face by the grooved bar. The web is then drawn through a tower oven supplied with air at about 177° C. (350° F.) to heat the LSR formulation sufficiently to remove the inhibitor and allow it to cure. The finished material weighs about 16 osy. The thickness in the smooth areas is about 0.3 mm (0.012 inch). The ribs on the face containing them are lenticular in cross section; they stand about 0.63 mm (0.025 inch) high above the smooth surface and are about 5 mm (0.2 inch) wide at the base.

A conveyor belt cover for use over a wire belt and to contact food items is constructed from the material produced as follows. Using cuts perpendicular to the longitudinal dimension of the finished material, a length of material corresponding to the width of the desired belt is cut from the web. As the finished belt is to be about 279 mm (11 inches) wide and about 83.8 cm (33 inches) long, the length cut from the 96.5 cm (38 inch) wide web is 279 mm (11 inches). The parallel, straight ribs, longitudinal on the web as it was coated, are now perpendicular to the longitudinal dimension of the belt to be constructed. Likewise, the sinusoidal ribs now also follow lines generally perpendicular to the longitudinal dimension of the belt. The piece is then cut to 838 cm (33 inches) and the belt is finished with the attachment of appropriate reinforcement material, lacings, and flaps to the narrow ends. This belt is placed in a food cooking or toasting apparatus and as the food is being conveyed by the belt the belt is placed in an inductive field. This inductive field heats the belt, which in turn cooks or toasts the food that is in contact with it.

Example 5

A length or "web" of DuPont Kapton® polyimide film 0.005 inches thick, which henceforth will be called the "carrier", is dip-coated on both faces with a film of polytetrafluoroethylene resin (PTFE) 0.001 inches thick, using a vertical coating tower typical of those used in the PTFE processing industry to coat fiberglass fabric, as follows:

The polyimide film carrier is drawn off a supply roll and passes under an idler roll or so-called "dip bar" two inches in diameter immersed in a bath of PTFE aqueous dispersion, the carrier entering and exiting the bath in an more-or-less vertical orientation. The PTFE aqueous dispersion is Fluon® AD1 LN, manufactured by Asahi Glass Fluoropolymers, USA Inc., modified by the addition of 0.5 percent, Zonyl® FSO, a fluorosurfactant manufactured by DuPont (A.I. duPont de Nemours and Company), to lower its surface tension ensuring uniform wetting of the carrier surface. The mixture is reduced with deionized water to 1.38 specific gravity. The carrier is drawn through the bath and the coating tower at 16 feet per minute (fpm).

The carrier emerging from the bath, covered with an excess of PTFE dispersion, passes through a pair of wirewound-type metering rods to remove the excess dispersion and leave the amount desired on the surfaces of the carrier. The metering rods are about 0.5 inches in diameter and wound with wire 0.025 inches diameter. The rods are rotated to enhance coating uniformity. The rods are oriented parallel to the plane of the web and perpendicular to the direction of web travel. They are positioned about 2 inches apart and offset from the centerline of the film path 0.3 inches, one contacting each face, so that the film passing between them is deflected in a zigzag or so-called "S" wrap.

The carrier, now coated on both faces with a liquid film of aqueous PTFE dispersion, next passes through the 6 foot long hot-air drying zone of the coating tower to remove the water from the dispersion. The air temperature is 250° F. (120° C.), chosen to dry the dispersion completely in the 20-second residence time in the drying zone, but not so rapidly as to cause blisters, cracks, or other defects that would disrupt the integrity and uniformity of the dried coating. The carrier exits the drying oven or zone with a coalesced film of PTFE particles and surfactant on both faces.

The carrier lastly passes through a 6-foot long baking/fusing zone, operating at an air temperature of 630° F. (332° C.) with supplemental radiant heaters operated at 1200° F. (649° C.), the radiant heaters facing both sides of the web 6 inches from the web path. In this zone the surfactant remaining in the dried film is removed and the PTFE particles are subsequently fused or sintered to form a continuous film of pure PTFE.

The carrier emerging from the process is now coated with a film of PTFE 0.0002 to 0.0003 inches thick adhering to both its faces. The carrier, now bearing the thin PTFE film, is returned to the process described above and a second thin layer of PTFE is applied, increasing the overall thickness of the PTFE film adhering to each face to about 0.0005 inches. Repeating the procedure two more times increases the thickness of the PTFE film adhered to each face to about 0.001 inches.

The outermost faces of the PTFE films adhering to the carrier are next coated with a mixture of colloidal silica and a melt-processable perfluoropolymer to convert the low-energy, non-reactive PTFE surface to a surface to which an adhesive bond may be achieved. The bondable layer is applied using the process for application of the PTFE layers described above, but in this case the coating fluid is a mixture of 17.5 parts by weight (pbw) of DuPont TE-9503, an aqueous dispersion of fluorinated ethylene propylene copolymer (FEP), 35.5 pbw of W.R. Grace Ludox® LS 30 colloidal silica dispersion, and 4.6 pbw of Sigma-Aldrich, Inc. Triton® X-100 nonionic surfactant, the mixture reduced with deionized water to 1.13 specific gravity. The remainder of the process is identical to the one previously described, except the web speed was 12 fpm and the air temperature in the baking/fusing zone was 615° F. (324° C.).

In the next step the now bondable outermost faces of the PTFE films adhering to the carrier are coated with a layer of liquid silicone rubber (LSR) in which a textile reinforcement is embedded. The process is similar to the one already described, employing the same coating tower and equipment, but the web speed is slower, 5 fpm, and it incorporates the additional operation of embedding the reinforcement. As before, the carrier is drawn through a reservoir of the fluid to be applied, however in this step the fluid is a 100 percent-solids liquid silicone rubber (LSR) formulation.

The LSR formulation is composed of 50 pbw of Dow Corning Corporation 9252-500P Part A and 50 pbw of 9252-SOOP Part B. Part A contains a platinum catalyst and Part B contains a crosslinker and a cure inhibitor that is removed by heating. The formulation also contains 75 pbw of a metal oxide mixture prepared to function as an inductive heating susceptor. The metal oxide mixture was purchased from Powdertech Corp., Valpariso, Ind., identified as product number FP350. The formulation viscosity is 50000 centipoise (Brookfield RV viscometer, No. 6 spindle at 10 rpm).

The web emerging from the reservoir, oriented vertically and moving upward, coated with an excess of the LSR formulation, passes between metering bars consisting of two horizontally-opposed two-inch-diameter precision steel rods clamped 0.015 inches apart to form a fixed gap. The thickness of the LSR coating on each face of the carrier after passing between the metering bars is 0.003 inches.

The carrier immediately encounters a second pair of horizontally-opposed two-inch-diameter rods, here not spaced a fixed distance apart but forced against each other with a loading of about 0.2 pounds force per inch of length (0.2 lbf/in, 0.35 N/cm), free to move apart horizontally as necessary to accommodate changes in the overall thickness of the web passing between them. At the point where the carrier enters the nip between these two rods, lengths or webs of textile reinforcement, a stitch-bonded, non-woven, polyester fabric weighing 3.0 ounces/square yard (osy), available from Superior Fabrics, Inc., Pompano Beach, Fla., 33069 as "Supreme 3-18 Gauge", are introduced into the nip on both faces of the carrier and are pressed into the uncured LSR as the three webs pass through the nip.

The web, now comprising the carrier with layers of PTFE film, uncured LSR formulation, and reinforcement adhering to both faces, is drawn into the oven. In this step, the oven is not divided into drying and baking zones, but is operated throughout its 12 foot length at 350° F. (177° C.), with no radiant supplement. In the oven an inhibitor is decomposed and/or driven off, freeing the platinum catalyst, allowing the LSR to cure or crosslink. The web emerging from the oven consists of the carrier with a length of finished product adhering to each face. In the final step of the process two lengths of finished product are stripped off the carrier, each equal in length to the length of the carrier.

The finished product is an asymmetric flexible composite with soft hand and exceptional tear resistance, about 0.017 inches thick and weighing about 7.7 osy. The product has sufficient physical integrity that it is virtually impossible to separate its components, even by destroying it. The PTFE coating on the working face is in intimate contact with and strongly bonded to the silicone rubber component, which in turn impregnates and is inseparable from the face of the reinforcement to which it is bonded. The opposite, non-working face is not coated or impregnated with silicone rubber and essentially retains its original textile nature. The film was placed in a 4 MHz induction field. The film became very hot while in the field indicating that the induction field was heating the film.

Example 6

One face of a roll of commercially available PTFE/glass fabric (Saint-Gobain Performance Plastics Basic 5), containing style 2116 glass fabric as a reinforcement and comprised of about 50 percent by weight PTFE resin and 50 percent by weight glass, was rendered bondable by applying a mixture of colloidal silica dispersion (W.R. Grace Ludox® 40), PFA fluoropolymer resin solution (Dupont TE-9946), surfactants, stabilizers, and water; wiping off the excess; drying; baking; and fusing. The fabric weighed about 5.4 ounces per square yard (osy) and was about 0.005 inches thick.

Using conventional PTFE tower-coating equipment, a coating of an LSR formulation identical to that used in the previous example again containing about 75 parts by weight of the inductive heating susceptor, was applied to the bondable face of the Chemglas Basic 5. The tower was operated to provide conditions of time and temperature sufficient to cause the rubber to cure. The end result was a composite with a smooth, glossy coating of silicone rubber on one face and a PTFE surface on the opposite face. The whole weighed about 7.5 osy. The silicone rubber coating was about 0.002 inches thick and is strongly adhered. The composite lays flat and can be handled easily without curling. The film was placed in a 4 MHz induction field. The film became very hot while in the field indicating that the induction field was heating the film.

What is claimed is:

1. A heating belt comprising:
    a flexible support comprising a fabric, the fabric being a woven fabric or an intermeshing of random fibrous strands; and
    a composite material coated on the flexible support, the composite material comprising a polymer and inductively-heatable particles.

2. The heating belt of claim 1, wherein the polymer forms a matrix phase in which the inductively-heatable particles are distributed.

3. The heating belt of claim 1, wherein the inductively-heatable particles comprise ferromagnetic particles.

4. The heating belt of claim 1, wherein the inductively-heatable particles are selected from a group consisting of SrF, zirconium alloy, and compounds stoichiometrically having two divalent cations combined with one of $Ba_1Fe_{16}O_{26}$, $Ba_2Fe_{12}O_{22}$, and $Ba_3Fe_{24}O_{41}$.

5. The heating belt of claim 4, wherein the divalent cations are selected from the group consisting of Mg, Co, Mn, and Zn.

6. The heating belt of claim 1, wherein the inductively-heatable particles have a Curie temperature.

7. The heating belt of claim 6, wherein the Curie temperature of the inductively-heatable particles is between 60° C. and 325° C.

8. The heating belt of claim 1, wherein the inductively-heatable particles comprise between about 10 volume percent and about 50 volume percent of the composite material.

9. The heating belt of claim 1, wherein the polymer has a carbon-based chain structure or a silicone based chain structure.

10. The heating belt of claim 1, wherein the polymer has a carbon-based chain structure and is selected from the group consisting of poly(etheretherketone) (PEEK), polyetherketoneketone (PEKK), poly(etherimide) (PEI), polyphenylene sulfide (PPS), poly(sulfone) (PSU), polyethylene terephthalate (PET), polyester, polyamide (PA), polypropylene (PP), polyurethane (PU), polyphenylene oxide (PPO), polycarbonate (PC), PP/mxd, PP/ethylene vinyl alcohol (EVOH), polyethylene (PE), fluorinated ethylene propylene (FEP), polytetrafluoroethylene (PTFE), polyimide, polyamide-imide (PAI), tetrafluoroethylene (TFE), hexafluoropropylene (HFP), perfluoropropyl or perfluoromethyl vinyl ether, homo and copolymers having chlorotrifluoroethylene (CTFE), homo and copolymers having vinylidene fluoride ($VF_2$), homo and copolymers having vinyl fluoride (VF), and combinations thereof.

11. The heating belt of claim 1, wherein the polymer comprises a polyimide.

12. The heating belt of claim 1, wherein the polymer comprises a fluorinated polymer.

13. The heating belt of claim 12, wherein the fluorinated polymer comprises at least one material from the group consisting of polytetrafluoroethylene (PTFE) and fluorinated ethylene propylene (FEP), perfluoroalkoxy (PFA), and combinations thereof.

14. The heating belt of claim 1, wherein the polymer comprises silicone.

15. The heating belt of claim 1, wherein the fabric is a woven fabric.

16. The heating belt of claim 1, wherein the fabric includes polymer fibers selected from the group consisting of aramids and polyesters.

17. The heating belt of claim 1, wherein the heating belt is a closed loop belt.

18. The heating belt of claim 1, wherein the heating belt is a cooking belt.

19. The heating belt of claim 1, wherein the heating belt is an industrial sealing belt.

20. The heating belt of claim 19, wherein the industrial heating belt is a side sealing belt.

21. The heating belt of claim 1, wherein the fabric comprises the polymer fibers, the polymer fibers including high temperature capable thermosetting resin.

22. The heating belt of claim 21, wherein the high temperature capable thermosetting resin includes polyimide.

23. The heating belt of claim 1, wherein the heating belt forms a continuous loop and forms an inner side and an outer side, wherein the composite material is coated on a first side of the flexible support and forms the outer side of the hearing belt.

24. The heating belt of claim 23, further comprising a material on a second side of the flexible support and forming the inner side of the heating belt.

25. The heating belt of claim 24, wherein the material includes a polymer and is free of inductively heatable particles.

26. The heating belt of claim 24, wherein the material is coated on the second side of the flexible support.

27. The heating belt of claim 24, wherein the material includes insulating material.

28. The heating belt of claim 1, wherein the fabric is a textile based on a thermally stable reinforcement selected from the group consisting of fiberglass, graphite, and polyaramid.

29. A heating component comprising:
a flexible support comprising a fabric, the fabric being a woven fabric or an intermeshing of random fibrous; and
a composite material coated on the flexible support, the composite material comprising a silicone polymer and inductively-heatable particles.

30. A system for heating an article, the system comprising:
a heating belt comprising:
a flexible support comprising a fabric, the fabric being a woven fabric or an intermeshing of random fiberous strands; and
a composite material coated on the flexible support, the composite material comprising a polymeric matrix and inductively-heatable particles; and
a field generator for inducing a field about the heating belt to heat the inductively-heatable particles.

31. The system of claim 30, wherein the article is a food item.

32. The system of claim 30, wherein the article is a package.

33. The system of claim 30, wherein the system is an industrial side sealing apparatus.

34. The system of claim 30, wherein the system is an industrial grill.

35. A method for heating an article, the method comprising:
placing the article in proximity to a heating belt, the heating belt comprising a flexible support comprising a fabric, the fabric being a woven fabric or an intermeshing of random fibrous strands, and a composite material coated on the flexible support, the composite material comprising a polymeric matrix and inductively-heatable particles; and
inducing a field about the heating belt, the inductively-heatable particles heating in the presence of the field, thereby heating the article.

36. The method of claim 35, wherein the article is on the heating belt.

37. The method of claim 35, wherein the article is a food item.

38. The method of claim 35, wherein the article is a package.

39. The method of claim 35, wherein the flexible support comprises glass fibers.

40. The method of claim 35, wherein the polymer matrix is a fluorinated polymer, silicone, or polyimide.

41. A heating belt forming a continuous loop and having an inner side and an outer side, the heating belt comprising:
a flexible support comprising a fabric; and
a composite material coated on a first side of the flexible support and forming the outer side of the heating belt, the composite material comprising a polymer and inductively-heatable particles; and
a material on a second side of the flexible support and forming the inner side of the heating belt, the material comprising inductively heatable particles or comprising an insulating material.

42. The heating belt of claim 41, wherein the material is the insulating material.

43. The heating belt of claim 41, wherein the fabric is a woven fabric.

44. The heating belt of claim 41, wherein the polymer is a silicone.

45. The heating belt of claim 41, further comprising a polymer layer overlying the composite material.

46. A heating belt forming a continuous loop and having an inner side and an outer side, the heating belt comprising:
   a flexible support comprising a fabric;
   a composite material coated on a first side of the flexible support and forming the outer side of the heating belt, the composite material comprising a polymer and inductively-heatable particles; and
   a coating material coated on a second side of the flexible support and forming the inner side of the heating belt, the coating material being free of inductively-heatable particles.

47. The hearing belt of claim 46, further comprising a polymer layer overlying the composite material.

48. The heating belt of claim 47, wherein the polymer layer includes silicone.

49. The heating belt of claim 46, further comprising an insulting material adjacent to the coating material.

50. The heating belt of claim 46, wherein the polymer comprises silicone.

* * * * *

UNITED STATES PATENT AND TRADEMARK OFFICE
CERTIFICATE OF CORRECTION

PATENT NO. : 7,323,666 B2 Page 1 of 1
APPLICATION NO. : 10/730173
DATED : January 29, 2008
INVENTOR(S) : Spohn et al.

It is certified that error appears in the above-identified patent and that said Letters Patent is hereby corrected as shown below:

In Column 13, Claim 23, line 56, please delete "hearing" and insert therefor --heating--.

In Column 14, Claim 30, line 15, please delete "fiberous" and insert therefor --fibrous--.

In Column 16, Claim 47, line 5, please delete "hearing" and insert therefor --heating--.

Signed and Sealed this

Sixth Day of October, 2009

David J. Kappos
*Director of the United States Patent and Trademark Office*